US010602151B1

(12) United States Patent
Lassahn

(10) Patent No.: US 10,602,151 B1
(45) Date of Patent: Mar. 24, 2020

(54) ESTIMATED MACROBLOCK DISTORTION CO-OPTIMIZATION

(75) Inventor: Jeffrey K. Lassahn, Portland, OR (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 1262 days.

(21) Appl. No.: 13/249,832

(22) Filed: Sep. 30, 2011

(51) Int. Cl.
*H04N 19/136* (2014.01)
*H04N 19/137* (2014.01)
*H04N 19/147* (2014.01)
*H04N 19/154* (2014.01)
*H04N 19/139* (2014.01)
*H04N 19/513* (2014.01)
*H04N 19/51* (2014.01)

(52) U.S. Cl.
CPC ......... *H04N 19/136* (2014.11); *H04N 19/137* (2014.11); *H04N 19/139* (2014.11); *H04N 19/147* (2014.11); *H04N 19/154* (2014.11); *H04N 19/51* (2014.11); *H04N 19/513* (2014.11)

(58) Field of Classification Search
CPC ....... H04N 19/00781; H04N 19/00278; H04N 19/00024; H04N 19/00587; H04N 19/00018; H04N 19/00484; H04N 19/00545; H04N 19/0003; H04N 19/00151; H04N 19/00715; H04N 19/00175

USPC ........................ 375/240.12, 240.16, 240.24
See application file for complete search history.

(56) References Cited

U.S. PATENT DOCUMENTS

2005/0286628 A1* 12/2005 Drezner ................... 375/240.2
2007/0160137 A1* 7/2007 Guo et al. ................ 375/240.1
2009/0003447 A1* 1/2009 Christoffersen et al. ...............
.................................................. 375/240.16

OTHER PUBLICATIONS

Zhang, Xi Min, et al., "Adaptive Field/Frame Selection for High Compression Coding", MERL—A Mitsubishi Electric Research Laboratory, http://www.merl.com, Jan. 2003, 13 pages.

* cited by examiner

*Primary Examiner* — Farhan Mahmud
(74) *Attorney, Agent, or Firm* — Hogan Lovells US LLP

(57) ABSTRACT

An apparatus including a first module and a second module. The first module may be configured to generate one or more values based upon an analysis of one or more samples of a first frame. The second module may be configured to encode one or more samples of a second frame taking into account the one or more values generated by the first module. The one or more values generally represent a measure of an effect on the one or more samples of the first frame of encoding decisions made during encoding of the one or more samples of the second frame.

20 Claims, 5 Drawing Sheets

ESTIMATED MACROBLOCK DISTORTION CO-OPTIMIZATION

FIELD OF THE INVENTION

The present invention relates to video processing generally and, more particularly, to a method and/or architecture for estimated macroblock distortion co-optimization.

BACKGROUND OF THE INVENTION

Conventional rate/distortion (RD) optimization in video encoders assumes that optimization decisions made for a current frame are independent of optimizations in future frames. In practice, the assumption is not correct. It is sometimes better to choose a locally sub-optimal setting for a macroblock in one frame in order to improve the quality of future frames. Solving the co-optimization problem exactly is extremely expensive.

It would be desirable to have a mechanism for inexpensively approximating the correct co-optimization solution.

SUMMARY OF THE INVENTION

The present invention concerns an apparatus including a first module and a second module. The first module may be configured to generate one or more values based upon an analysis of one or more samples of a first frame. The second module may be configured to encode one or more samples of a second frame taking into account the one or more values generated by the first module. The one or more values generally represent a measure of an effect on the one or more samples of the first frame of encoding decisions made during encoding of the one or more samples of the second frame.

The objects, features and advantages of the present invention include providing a method and/or architecture for estimated macroblock distortion co-optimization that may (i) provide an inexpensive mechanism for approximating correct co-optimization of macroblock distortion, (ii) modify a rate distortion cost expression to take into account future effects of current decisions, (iii) analyze macroblocks a few frames ahead of a main encoder, (iv) generate a value approximating an underestimate of quality loss to a video frame from the addition of distortion to a macroblock, and/or (v) be implemented efficiently with a graphics processing unit (GPU) based encoder.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
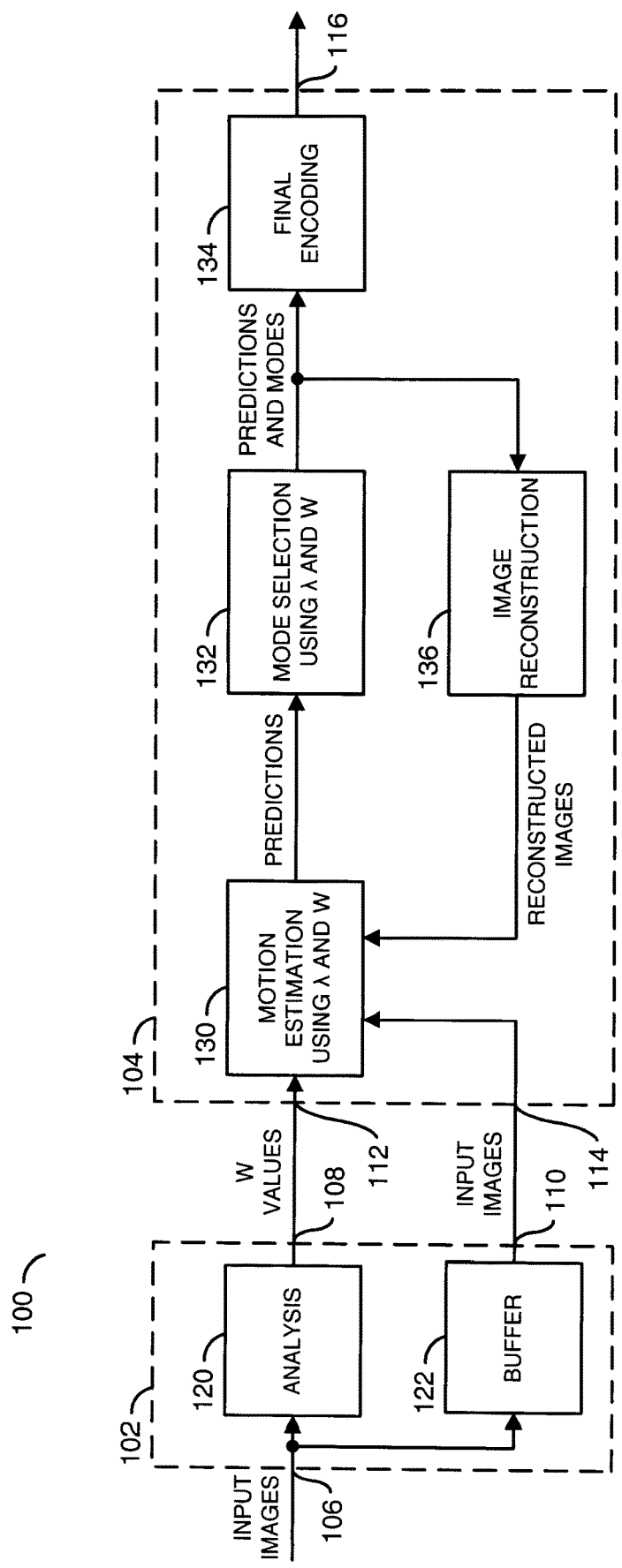
FIG. 1 is a block diagram illustrating an example encoder in accordance with an example embodiment of the present invention.

Referring to FIG. 1, a block diagram is shown illustrating a circuit 100 implementing an encoder in accordance with an example embodiment of the present invention. In one example, the circuit 100 may include a first module 102 and a second module 104. In one example, the module 102 may implement a pre-encoder and the module 104 may implement a main encoder. The module 102 may be configured to analyze frames of a video sequence to estimate how much distortions (e.g., image distortion, perceptual distortion, etc.) caused by an encoding process (e.g., motion estimation and mode decisions, etc.) in one frame persist in subsequent frames. The analysis performed by the module 102 generally approximates an analysis performed in the module 104. The module 102 may be further configured to generate values (e.g., W values), which are representative of the estimates generated during the analysis performed by the module 102. The W values may be used by the module 104 along with distortions in a particular frame for cost comparisons (e.g., rate/distortion optimization, psychovisual optimization, etc.) made during encoding of the respective frame. For example, the module 104 may be configured to encode images using conventional techniques modified to utilize the W values in accordance with an embodiment of the present invention.

In one example, the module 102 may have an input 106 that may receive a signal (e.g., INPUT_IMAGES) and an output 108 that may present a signal (e.g., W_VALUES). The signal INPUT_IMAGES may comprise a sequence (or stream) of frames. The sequence of frames may be live or from a storage medium (e.g., memory, etc.). In one example, the sequence of frames may be stored in a storage medium that is commonly accessible by both the module 102 and the module 104. The signal W_VALUES may comprise W values representing the estimated (or approximated) persistence of distortions from one frame into subsequent frames. In one example, the module 102 may be configured to generate estimates for a number of frames (e.g., 4) prior to presentation at the output 108. In another example, the module 102 may also have an output 110 that may present a delayed version of the signal INPUT_IMAGES. In one example, the module 102 may be configured to provide W values and information (e.g., a pointer into the commonly accessible storage medium) identifying the image corresponding to the W values. In another example, the module 102 may provide the W values along with the corresponding image. However, other configurations may be implemented accordingly to meet the design criteria of a particular implementation.

The module 104 may have an input 112 that may receive the signal W_VALUES from the output 108 of the module 102. When the module 102 includes the output 110, the module 104 may also have an input 114 that may receive the frames corresponding to the W values. Alternatively, the module 104 may be configured to retrieve the corresponding frames (e.g., from the commonly accessible storage medium). The module 104 may present a finally encoded sequence (or stream) at an output 116. The module 104 may be configured to encode frames received at the input 114 or retrieved from the commonly accessible storage medium using conventional techniques modified to use the estimates (e.g., W values) contained in the signal W_VALUES in accordance with embodiments of the present invention.

In general, the encoding process performed by the module 104 involves an analysis similar to the analysis performed in the module 102. In one example, the analysis performed by the modules 102 and 104 may comprise motion estimation and mode selection. In another example, the analysis performed by the modules 102 and 104 may comprise measuring a perceptual distortion that may be used in psychovisual optimization. However, other analysis operations may be implemented accordingly to meet the design criteria of a particular implementation.

In one example, the module 102 may comprise a module 120 and a module 122. The module 120 may be implemented, in one example, as an analysis module. The module 122 may be implemented, in one example, as a buffer or delay module. In one example, the signal INPUT_IMAGES may be presented to both of the modules 120 and 122. In another example, the signal INPUT_IMAGES may be presented to the module 122 for buffering (e.g., temporary storage), and the module 120 may be configured to retrieve frames from the module 122 for analysis. In one example, the module 120 may be configured to analyze samples (e.g., pixels, macroblocks, strips, slices, etc.) of frames to determined estimates of the persistence of distortion from one frame to subsequent frames. The module 122 may be configured to buffer or delay presentation of a particular frame at the output 110 until the module 120 has analyzed the particular frame. In one example, the module 122 may store a predetermined number of frames that the module 120 is analyzing. For example, the module 122 may be configured, in one embodiment, to buffer four or five frames. However, other numbers of frames may be implemented accordingly to meet the design criteria of a particular implementation. In one example, the module 122 may be implemented separately from the module 102 (e.g., as part of the storage medium commonly accessible by the modules 102 and 104).

In one example, the module 104 may comprise a module 130, a module 132, a module 134, and a module 136. In one example, the module 130 may be configured to perform motion estimation on a current frame either received at the input 114 or retrieved from the commonly accessible storage medium taking into account distortions of the current frame caused by the encoding process, the corresponding W values received at the input 112, and the rate/distortion cost multiplier (e.g., A). The distortions and A may be determined using conventional techniques. The module 130 may have a first input that may receive the signal W_VALUES, a second input that may receive the signal INPUT_IMAGES, a third input that may receive a signal (e.g., RECONSTRUCTED_IMAGES), and an output that may present a signal (e.g., PREDICTIONS). The signal RECONSTRUCTED_IMAGES may comprise reconstructed images. The reconstructed images may be generated using conventional techniques. In one example, the reconstructed images may be stored in the commonly accessible storage medium or a separate buffer. The module 130 may be configured to generate the signal PREDICTIONS in response to the signal W_VALUES, the signal INPUT_IMAGES, and the signal RECONSTRUCTED_IMAGES. Although an example is presented where the module 104 comprises modules 130-136 and performs motion estimation and mode selection taking into account the W values, it would be apparent to those skilled in the field of the present invention that other numbers of modules and other encoding operations utilizing the W values may be implemented accordingly to meet the design criteria of a particular implementation.

The module 132 may have, in one example, an input that may receive the signal PREDICTIONS and an output that may present predictions and selected modes to an input of the module 134 and an input of the module 136. In one example, the module 132 may be configured to make mode selections during encoding of the current frame. The mode selections may be determined taking into account the distortions, the rate/distortion multiplier A, and the W values corresponding to the current frame. However, other operations utilizing the W values may be implemented accordingly to meet the design criteria of a particular implementation. The module 136 may be configured to generate the reconstructed images in response to the predictions and modes presented at the output of the module 132. The module 134 may be configured to perform a final encoding for the current frame in response to the predictions and modes presented at the output of the module 132. Although the modules 102-136 have been described as circuits, it would be apparent to those skilled in the field of the present invention that the modules 102-136 may represent circuits and/or blocks that may be implemented as hardware, software, a combination of hardware and software, or other implementations.

Figure 2:
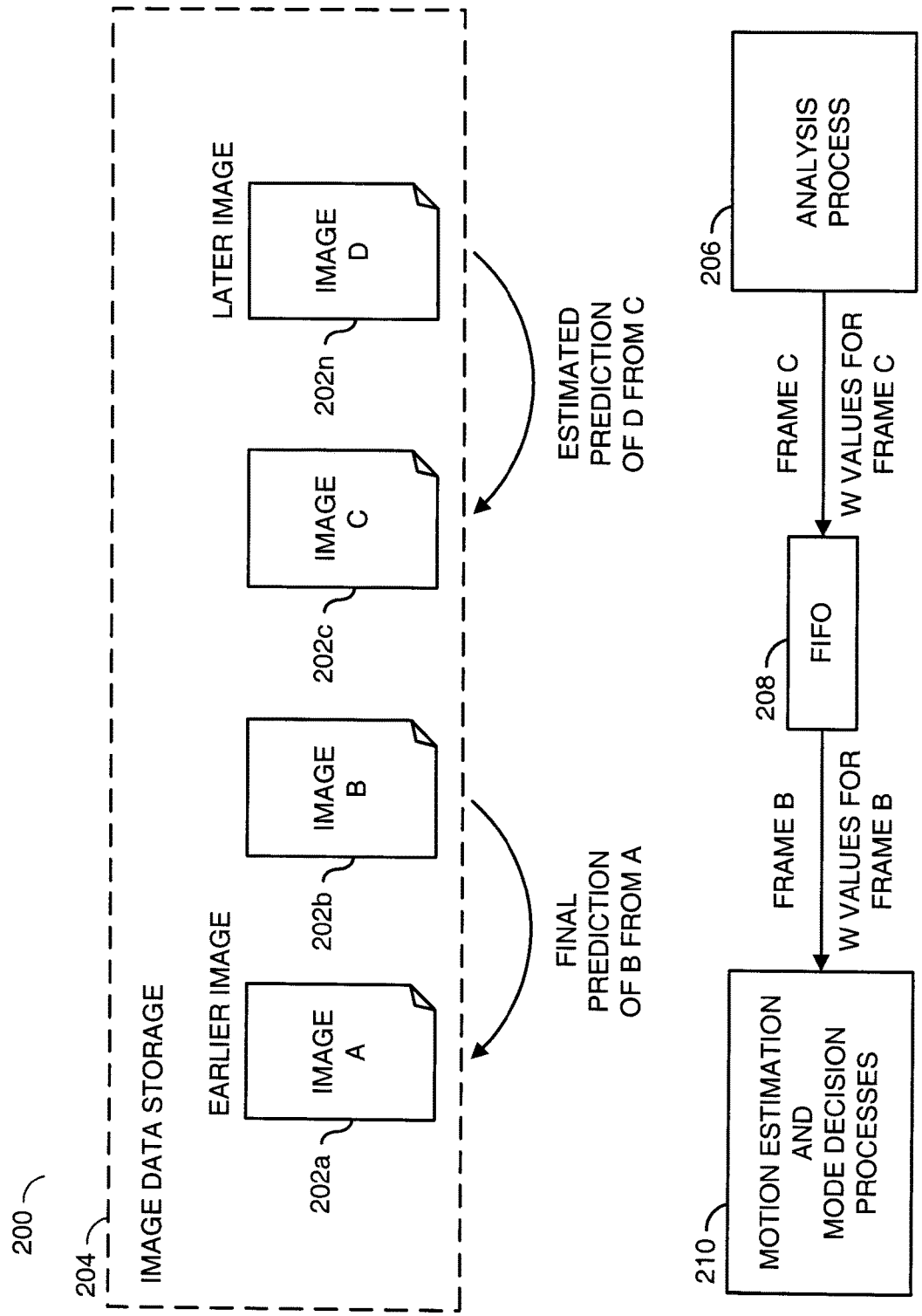
FIG. 2 is a diagram illustrating an example analysis process in accordance with an example embodiment of the present invention.

Referring to FIG. 2, a diagram is shown illustrating an analysis process 200 in accordance with an example embodiment of the present invention. In one example, a number of images 202a-202n may be stored in an image data storage unit 204. An analysis process 206 may be used to perform an estimated prediction of the images stored in the image data storage unit 204. For example, the analysis process (or method) 206 may perform an analysis including estimated prediction of the image 202n from the image 202c, estimated prediction of the image 202c from the image 202b, and estimated prediction of the image 202b from the image 202a. The estimated prediction of a later frame from an earlier frame may generate a number of W values for the earlier frame. In one example, the W values for the earlier frame may be placed into a queue 208. In one example, the queue 208 may be implemented as a first-in-first-out (FIFO) memory. The queue 208 may present the W values generated by the analysis process 206 as they are needed by motion estimation and mode decision processes 210.

In one example, the images 202a-202n may also be passed through the FIFO buffer 208 to maintain synchronization with the corresponding W values. The processes 206 and 210 are generally operations on different images. For example, images 202a and 202b may be being processed by the process 210 (e.g., in the main encoder) while images 202c-202n are being processed (e.g., analyzed) by the process 206 (e.g., in a pre-encoder). In one example, images may be held by the analysis stage (e.g., the process 206) while the analysis stage is using the images. When the analysis stages no longer needs the images, the image may be passed to the main encoder stage along with the corresponding W values determined in the analysis stage.

Figure 3:
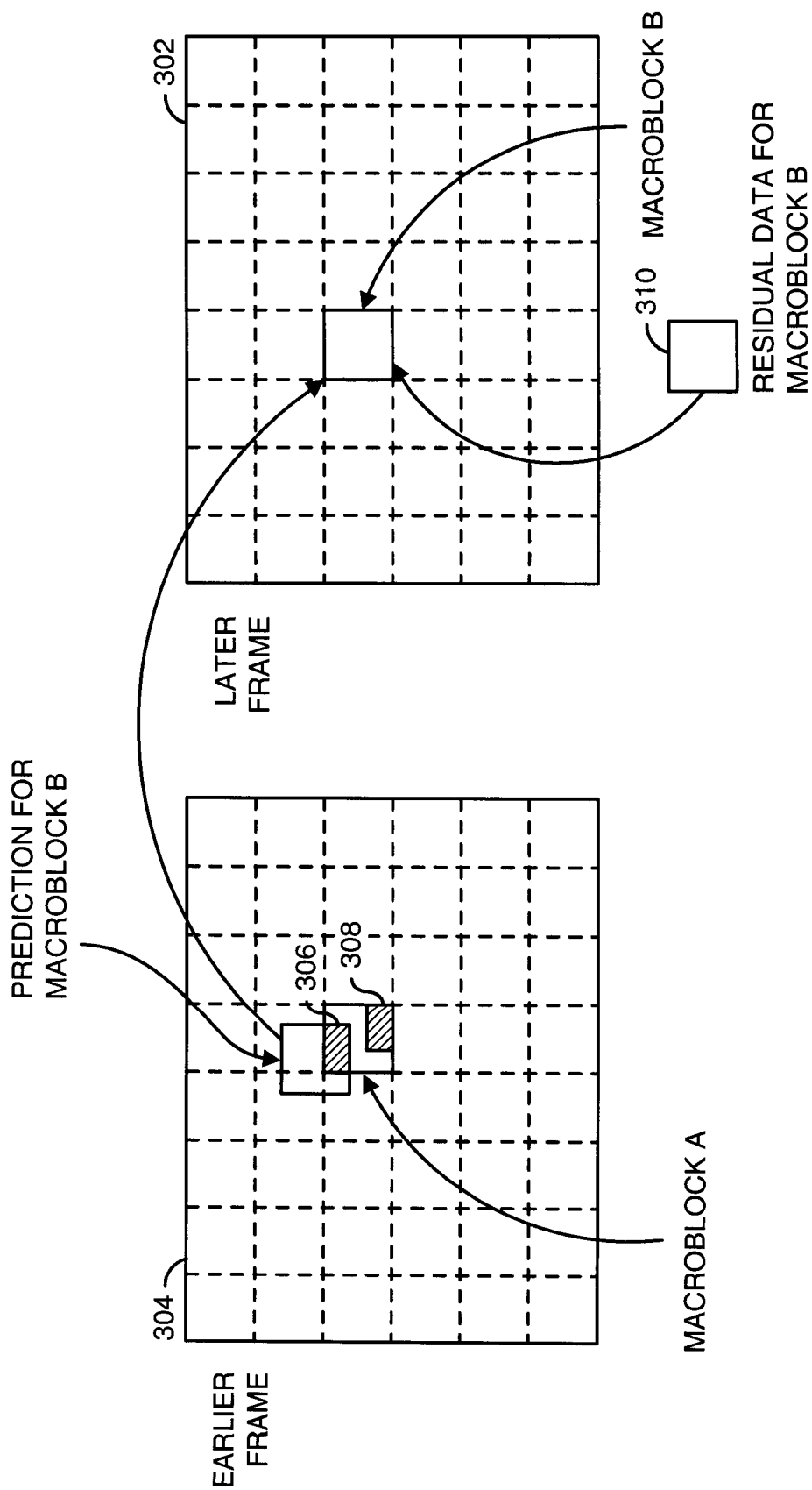
FIG. 3 is a diagram illustrating data sources for computing a macroblock W value in accordance with an example embodiment of the present invention.

Referring to FIG. 3, a diagram is shown illustrating data sources for computing a macroblock W value in accordance with an example embodiment of the present invention. In one example, a macroblock B of a later frame 302 may be predicted based upon macroblock data in an earlier frame 304. For example, portions 306 and 308 of a macroblock A may be used for prediction of macroblocks (e.g., macroblock B, etc.) in later frames. The analysis of macroblock B in later frame 302 using the prediction data (e.g., portion 306 from macroblock A) of the earlier frame 304 generally results in a residual data block 310 for macroblock B.

In general, the quality of a reference frame (e.g., earlier frame 304) affects the quality of frames predicted from the reference frame (e.g., later frame 302). Allocating extra bits to a reference frame may save bits in later frames when the later frames are heavily predicted from the reference frame. In one embodiment of the present invention, a method for estimating the correct distortion cost for encoding decisions in a current frame is provided. Prior to actual encoding of a sequence of images, an encoding system in accordance with an embodiment of the present invention may perform an analysis (e.g., approximate motion estimation, etc.) pass on the sequence of images. The analysis pass is generally kept a few frames ahead of the main (actual) encoding pass.

During the analysis pass, for each sample (e.g., pixel, macroblock, strip, slice, etc.) in a frame (image) that is used for reference, a note may be made whether any later frames are predicted using data in a respective sample as part of the prediction. In one example, a value (e.g., w_0) may be calculated, where the value w_0 represents, in one example, the weighting for just the extra distortion caused to the next frame (e.g., the fraction of the information in future pixels that comes from the respective sample rather than from residual or some other prediction). In one example, the value w_0 may be set to a first value (e.g., 1) when the future sample is an exact copy of the reference sample, a second value (e.g., 0) when no data from the reference sample is used in any future frames, and/or a third value that varies smoothly between the extremes (e.g., proportional to the amount of data from the reference sample that is used in any future frames). The value w_0 generally represents an estimate of how much a naive rate/distortion optimization, psychovisual optimization, etc. would underestimate the quality loss to the video sequence from adding distortion to the respective sample.

The future frame that predicts from the respective sample may itself be used as a reference, resulting in yet more reuse of the data. A simple estimate of the effect of the reuse of the data may be made by assuming the prediction behavior of the future frame will be similar to the prediction behavior of the current frame, as will any even farther removed frames that predict off of the future frame. In one example, the total data use may be expressed roughly using the following Equation 1:

$$W\_total \approx 1 + w\_0 + w\_0^2 + w\_0^3 + \ldots = 1/(1 - w\_0), \quad \text{Eq. 1}$$

where W_total represents the estimated weighting for the distortion to this frame plus the extra distortion to all future frames. In general, the value W_total goes to infinity when w_0 is 1. Thus, if prediction is perfect, the data in the initial frame will continue to be reused forever and quality contribution of data from the initial frame is infinitely greater than if the data from the initial frame were used only once. In real world application, the expression of Equation 1 may be bounded to a finite value.

In the final encoding step for the sample during the main encoding pass, the encoder may determine, in one example, a rate/distortion cost, psychovisual distortion cost, etc. according, for example, to the following expression:

$$\text{cost} = 1/(1-w\_0) \times SSE + \lambda \times \text{bits}, \quad \text{Eq. 2}$$

where SSE represents a standard sum of squared errors. The above expression may be contrasted to the conventional cost expression:

$$\text{cost} = SSE + \lambda \times \text{bits}. \quad \text{Eq. 3}$$

In one example, the cost expression implemented by the encoder may be simplified as follows:

$$\text{cost} = SSE + \lambda \times (1-w\_0) \times \text{bits}. \quad \text{Eq. 4}$$

In one example, the W values transmitted by the analysis stage to the main encoder stage (e.g., from the module 102 to the module 104 in FIG. 1) may be implemented as the value int total and the main encoder stage may implement a cost function utilizing Equation 2 above. In another example, the W values transmitted by the analysis stage to the main encoder stage may be implemented as the value (1−w_0) and the main encoder stage may implement the cost function utilizing Equation 4 above. In one example, the cost functions described above may be implemented efficiently by having, for example, the analysis (or preprocessing) pass store a per-sample, or per-macroblock, array of W values.

Figure 4:
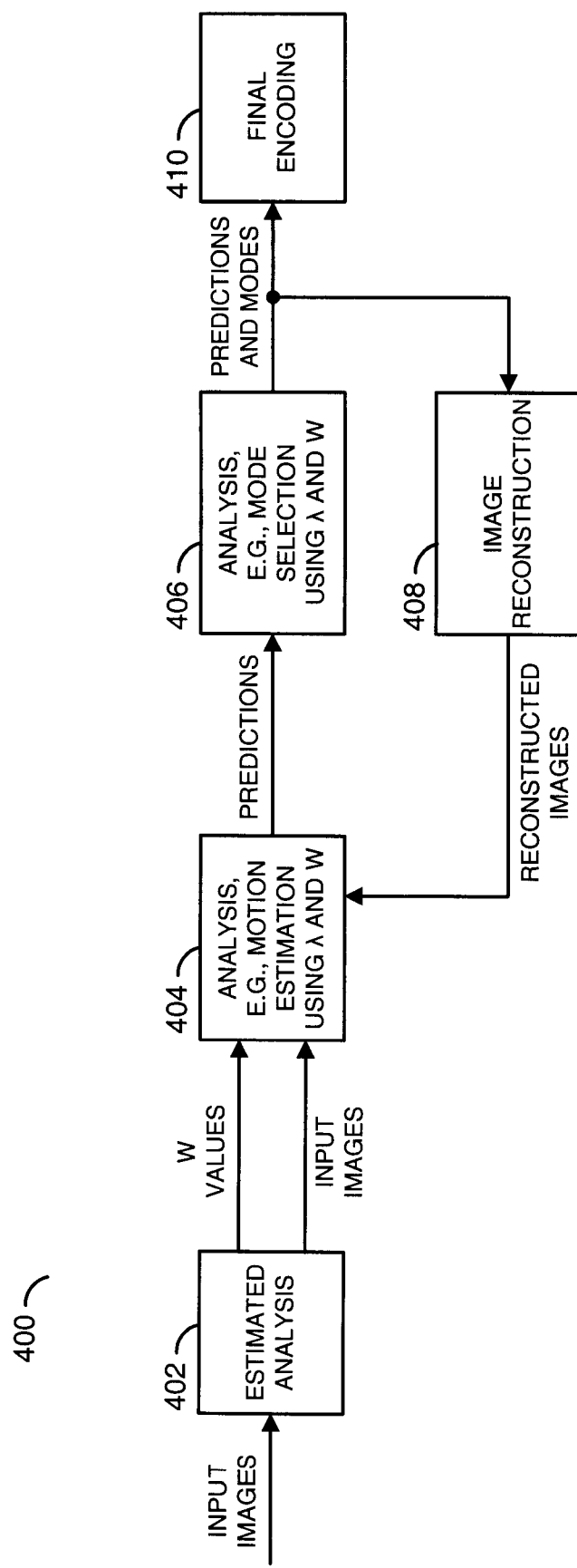
FIG. 4 is a flow diagram illustrating an example encoding process in accordance with an example embodiment of the present invention.

Referring to FIG. 4, a flow diagram is shown illustrating a process 400 in accordance with an example embodiment of the present invention. In one example, the process (or method) 400 may comprise a step (or state) 402, a step (or state) 404, a step (or state) 406, a step (or state) 408, and a step (or state) 410. In the state 402, the process 400 may receive a sequence of input images. The process 400 may analyze the input images to generate a number of values (e.g., W values). In one example, the W values may be based on an approximated motion estimation for the input images. In another example, the W values may be based on a measure of perceptual distortion for a psychovisual optimization of the input images. In one example, the W values may represent a measure of the persistence of distortions (e.g., caused by encoding decisions made for a current frame) in future frames.

The W values and the input images analyzed in the state 402 may be passed as inputs to the state 404. In the state 404, the process 400 generally begins the main encoding process for the input images. In one example, the state 404 may comprise performing motion estimation on the input images. The motion estimation process performed during the state 404 may use the W values determined in the state 402 along with λ values and reconstructed images. The λ values and reconstructed images utilized in the state 404 may be generated in accordance with conventional techniques. The motion estimation process performed in the state 404 generally produces predictions, which may be presented as inputs to the state 406.

In the state 406, the process 400 may use the predictions generated in the state 404 along with the λ values and the W values to select particular modes for encoding the input images. The predictions and selected modes may then be passed as inputs to the state 408 and the state 410. In the state 408, the process 400 may perform image reconstruction in order to generate a number of reconstructed images that may be presented as inputs to the state 404. The reconstructed images may be generated using conventional techniques. In the state 410, the process 400 generally performs a final encoding of the input images based upon the predictions and modes from the previous states.

Figure 5:
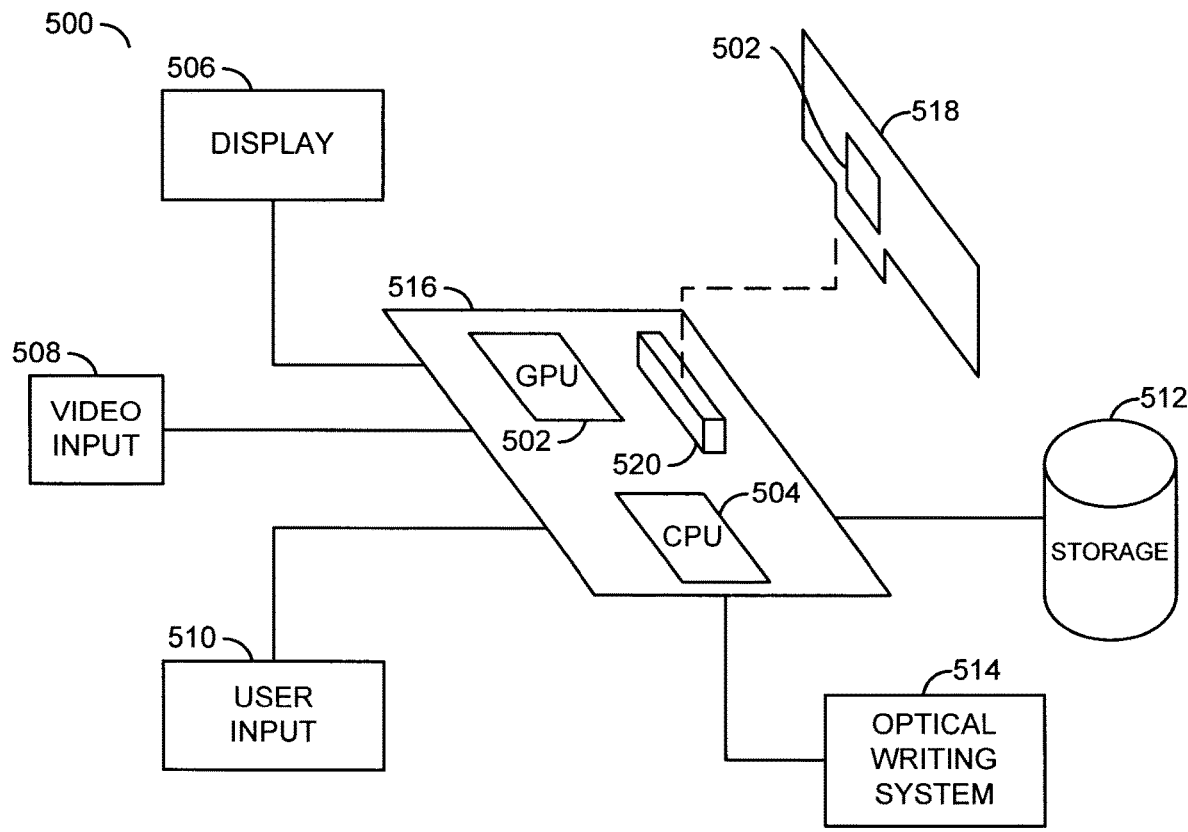
FIG. 5 is a block diagram illustrating an example system implementing an encoder in accordance with an example embodiment of the present invention.

Referring to FIG. 5, a block diagram of a system 500 is shown illustrating a context for implementing an encoder in accordance with an example embodiment of the present invention. In one example, an encoder in accordance with an example embodiment of the present invention may be implemented in a computer system 500 that may include both a graphics processing unit (GPU) 502 and a central processing unit (CPU) 504. The system 500 may also include, but is not limited to, an output device (e.g., display, monitor, etc.) 506, a video input module 508, an user input device (e.g., keyboard, mouse, etc.) 510, a storage device (e.g., hard drive, memory, etc.) 512, and an optical disc writing system 514. In one example, a main encoder as described above may be implemented as software instructions that may be executed by the CPU 504. In another example, the main encoder may be implemented with at least a motion estimation process that runs on the graphics processing unit (GPU) 502 or some other massively parallel processor. For efficiency, the analysis (or preprocessing) process described above should also be run on the same processor as the main encoder. In general, the analysis calculation described above is easily parallelizable. When the encoder is implemented to utilize the GPU or other parallel processor, the array of W values may be stored in an array on the GPU or other parallel processor.

The GPU 502 may be implemented, in one example, as a device (e.g., from NVIDIA, AMD, INTEL, etc.) mounted either on a motherboard 516 or on a card 518 that connects to the motherboard 516 via a connector 520. The GPU 502 may comprise, in one example, a plurality of parallel processors on one device. The GPU 502 may be configured to process data in parallel using the plurality of parallel processors. The CPU 504 may be implemented as one or more processors (or cores) mounted on the motherboard 516 (e.g., via a socket). An encoder (e.g., H.264, etc.) may be implemented that takes advantage of the parallel processors and the serial processors by efficiently partitioning the encoder across the processor sets. The encoder may be configured to encode an image using distortions of a current frame plus an estimate of how much the distortions persist in future frames in different modes for cost comparisons made during encoding.

Figure 6:
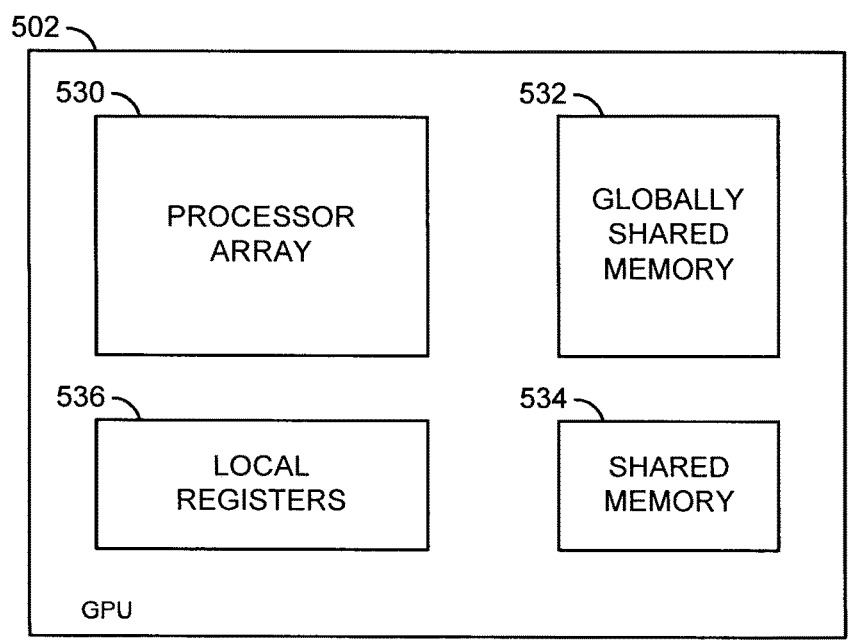
FIG. 6 is a diagram illustrating an example GPU of FIG. 5.

Referring to FIG. 6, a diagram is shown illustrating an example of a GPU 502 in accordance with an example of an embodiment of the present invention. In one example, the GPU 502 may comprise an array of parallel processors 530, a globally shared memory 532, a shared memory 534, and a plurality of local registers 536. The shared memory 534 is generally implemented with faster memory than the globally shared memory 532. Each of the processors in the parallel processor array 530 may have access to the globally shared memory 532, a portion of the shared memory 534, and a number of the local registers 536. In one example, a subset of the processors in the parallel processor array 530 (e.g., 8) may share a respective portion of the shared memory 534. However, other architectures may be implemented accordingly to meet the design criteria of a particular implementation. In general, the GPU 502 may be configured to efficiently carry out the same computation on parallel data sets. The CPU 504 may be configured to provide serial processing where serial computations are completed very quickly.

In one example, an embodiment of the present invention generally provides a method for encoding an image using distortions of a current frame plus an estimate of how much the distortions persist in future frames in different modes for cost comparisons made during encoding. In one example, an analysis stage may be implemented prior to a main encoding stage, where the analysis stage approximates an encoding operation of the main encoding stage and generates values representing an estimate of the data reuse between frames being encoded. The estimated values may be used in addition to distortions in a frame to calculate the true distortion cost for encoding decisions made during the encoding of the frame.

The functions performed by the diagram of FIG. 4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A non-transitory computer-readable storage medium including instructions that, when executed by at least one processor of a computing device, cause the computing device to:
   receive a plurality of frames of a video sequence;
   pre-encode said plurality of frames of said video sequence and analyze the pre-encoded frames to estimate how much distortion caused by encoding decisions in a reference frame persists in one or more subsequent frames, wherein the reference frame is a frame in the received plurality of frames;
   generate one or more values for the reference frame based upon the analysis of the pre-encoded frames, wherein the one or more values are representative of distortions persisting from the reference frame into the one or more subsequent frames;
   receive said plurality of frames of said video sequence and said one or more values for the reference frame;
   determine a rate distortion value, based at least in part on the one or more values generated, representing estimated distortion to the one or more subsequent frames;
   select a mode for encoding the reference frame based at least on the rate distortion value; and
   encode one or more samples of the reference frame based on the mode.

2. The non-transitory computer-readable storage medium including instructions according to claim 1, wherein said one or more values for the reference frame are based upon analysis of one or more macroblocks of the reference frame.

3. The non-transitory computer-readable storage medium including instructions according to claim 1, wherein said pre-encoding and analysis comprises an approximated motion estimation.

4. The non-transitory computer-readable storage medium including instructions according to claim 1, wherein said pre-encoding and analysis comprises an approximated psychovisual optimization.

5. The non-transitory computer-readable storage medium including instructions according to claim 1, wherein said one or more values represent a measure of an amount of data from the reference frame that is used in predicting said one or more subsequent frames.

6. The non-transitory computer-readable storage medium including instructions according to claim 5, wherein said one or more values are set to a first value when a future macroblock is an exact copy of a reference macroblock, set to a second value when no data from a reference macroblock is used in any future frames or set proportional to an amount of data from a reference macroblock that is used in any future frames.

7. The non-transitory computer-readable storage medium of claim 1 including further instructions that, when executed by the at least one processor of the computing device, further cause the computing device, to modify an encoding cost calculation based upon said one or more values.

8. The non-transitory computer-readable storage medium of claim 7 including further instructions that, when executed by the at least one processor of the computing device, further cause the computing device, to modify a rate distortion cost calculation based upon said one or more values.

9. The non-transitory computer-readable storage medium of claim 1 including further instructions that, when executed by the at least one processor of the computing device, further cause the computing device, to modify a measure of perceptual distortion calculation based upon said one or more values.

10. The non-transitory computer-readable storage medium of claim 1 including further instructions that, when executed by the at least one processor of the computing device, further cause the computing device, to perform said analysis a number of frame periods prior to the encoding of the one or more samples.

11. A method of estimated distortion co-optimization comprising:
   pre-encoding and analyzing a plurality of frames of a video sequence to estimate how much distortion caused by an encoding decision in a reference frame persists in one or more subsequent frames, wherein the pre-encoding approximates a subsequent encoding process, and wherein the reference frame is a frame in the received plurality of frames;
   generating one or more values for the reference frame based upon the analysis of the pre-encoded frames, wherein the one or more values are representative of distortions persisting from the reference frames into the one or more subsequent frames;
   determining a rate distortion value based at least in part on the one or more values associated with estimated distortion to the one or more subsequent frames;
   selecting a mode for encoding the reference frame based at least on the rate distortion value; and
   encoding one or more samples of the reference frame based on the mode selection.

12. The method according to claim 11, wherein said one or more values for the reference frame are based upon analysis of one or more macroblocks of the reference frame.

13. The method according to claim 11, wherein said pre-encoding and analyzing comprises an approximated motion estimation.

14. The method according to claim 11, wherein said pre-encoding and analyzing comprises an approximated psychovisual optimization.

15. The method according to claim 11, wherein said one or more values represent a measure of an amount of data from the reference frame that is used in predicting said one or more subsequent frames.

16. The method according to claim 15, wherein said one or more values are set to a first value when a future macroblock is an exact copy of a reference macroblock, set to a second value when no data from a reference macroblock is used in any future frames, or set proportional to an amount of data from a reference macroblock that is used in any future frames.

17. The method according to claim 11, wherein encoding said one or more samples of the reference frame comprises modifying an encoding cost calculation based upon said one or more values.

18. The method according to claim 17, wherein encoding said one or more samples of the reference frame comprises at least one of modifying a rate distortion cost calculation based upon said one or more values and modifying a measure of perceptual distortion calculation based upon said one or more values.

19. The apparatus according to claim 1, wherein said analysis and said encoding are performed using a graphics processing unit (GPU) and said one or more values are stored in an array on said graphics processing unit.

20. An apparatus comprising:
one or more processors; and
memory including instructions that, upon being executed by the one or more processors, cause the apparatus to:
pre-encode and analyze a plurality of frames of a video sequence to estimate how much distortion caused by encoding decisions in a reference frame persists in one or more subsequent frames, wherein the pre-encoding approximates a subsequent encoding process, and wherein the reference frame is a frame in the received plurality of frames;
generate one or more values for the reference frame based upon the analysis of the pre-encoded frames, wherein the one or more values are representative of distortions persisting from the reference frame into the one or more subsequent frames;
determine a rate distortion value based at least in part on the one or more values associated with estimated distortion to the one or more subsequent frames;
select a mode for encoding the reference frame based at least on the rate distortion value; and
encode one or more macroblocks of the reference frame based on the mode selection.

* * * * *